(12) United States Patent
Spahic

(10) Patent No.: US 7,868,252 B2
(45) Date of Patent: Jan. 11, 2011

(54) ELECTRICAL LOCKING HUB NUT

(76) Inventor: Rifet Spahic, c/o Juneau Partners P.O. Box 2516, Alexandria, VA (US) 22301

( * ) Notice: Subject to any disclaimer, the term of this patent is extended or adjusted under 35 U.S.C. 154(b) by 247 days.

(21) Appl. No.: 12/135,168

(22) Filed: Jun. 7, 2008

(65) Prior Publication Data

US 2010/0263925 A1    Oct. 21, 2010

(51) Int. Cl.
*H01R 4/00*    (2006.01)
(52) U.S. Cl. .................... 174/84 R; 174/660
(58) Field of Classification Search ........... 174/84 R, 174/650, 654, 660, 93
See application file for complete search history.

(56) References Cited

U.S. PATENT DOCUMENTS

| | | | |
|---|---|---|---|
| 2,657,251 A * | 10/1953 | Bergan | ............ 174/660 |
| 5,208,427 A | 5/1993 | Couto et al. | |
| 5,310,963 A * | 5/1994 | Kennelly | ............ 174/667 |
| 5,321,205 A | 6/1994 | Bawa et al. | |
| 5,374,785 A | 12/1994 | Bedkowski et al. | |
| 5,378,027 A * | 1/1995 | Gehring | ............ 285/322 |
| RE38,294 E | 11/2003 | Nattel et al. | |
| D484,036 S | 12/2003 | Koch | |
| 7,078,623 B1 | 7/2006 | Sheehan | |
| 7,735,876 B2 * | 6/2010 | Chiu | ............ 285/207 |
| 2005/0087357 A1 * | 4/2005 | Steinich | ............ 174/65 R |

* cited by examiner

*Primary Examiner*—Chau N Nguyen
(74) *Attorney, Agent, or Firm*—Todd Juneau; Jason Tiedeman

(57) ABSTRACT

The invention relates to an electrical connector locking hub nut that does not damage the wiring during pulling, frees up manpower by allowing one person rather than two to be able to do the pulling, has a simplified design, and which has universal threading for conduit of all currently approved sizes and materials.

8 Claims, 3 Drawing Sheets

Section B-B

FIGURE 1
Fig. 1a
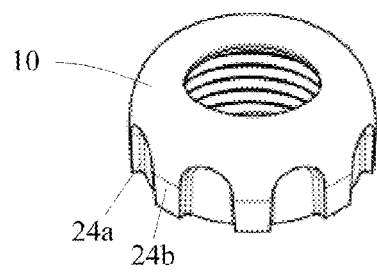
Fig. 1b
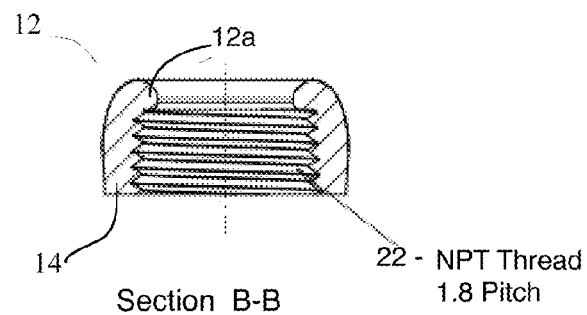
Section B-B
22 - NPT Thread 1.8 Pitch
Fig. 1c
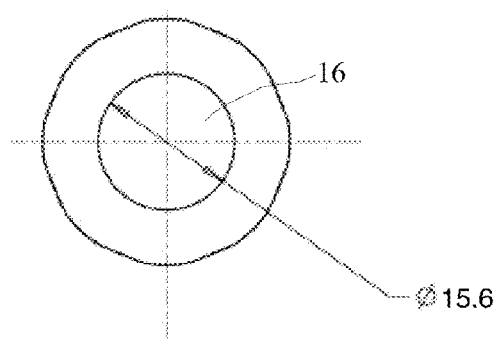
Fig. 1d
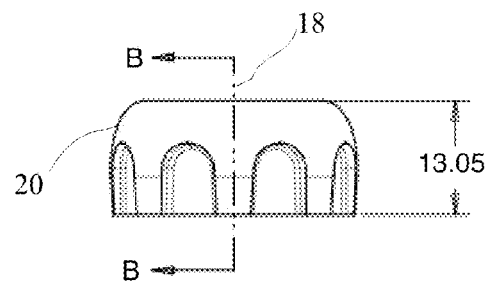
Fig. 1e
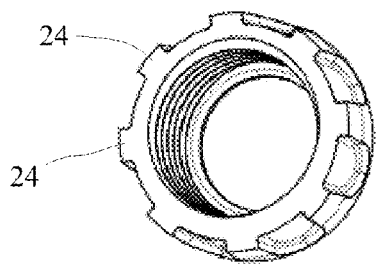
Fig. 1f
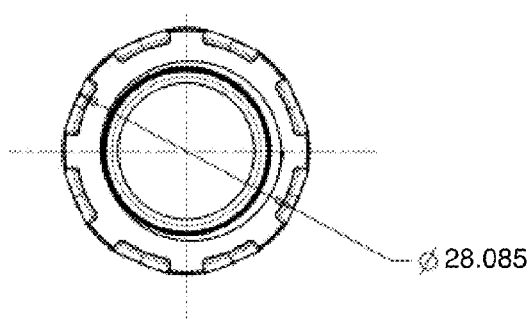

FIGURE 2
Fig. 2a
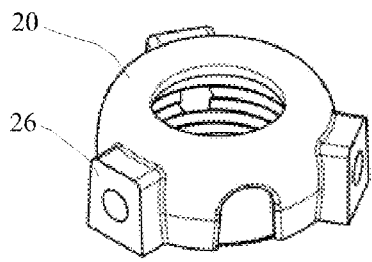
Fig. 2b
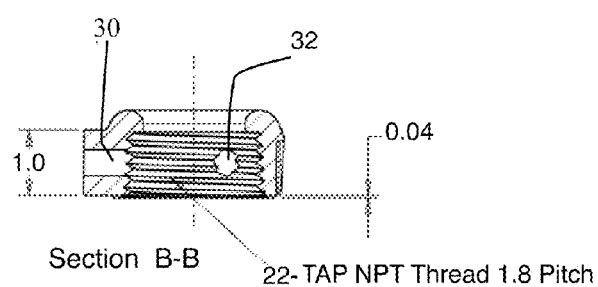
Fig. 2c
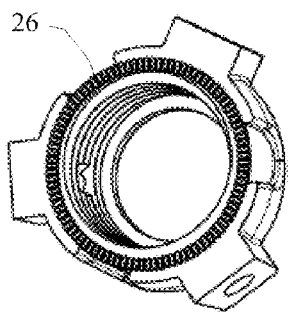
Fig. 2d
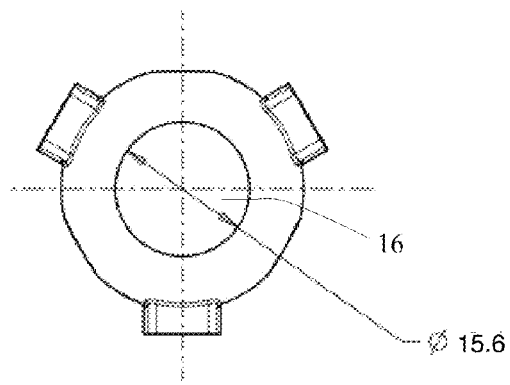
Fig. 2e
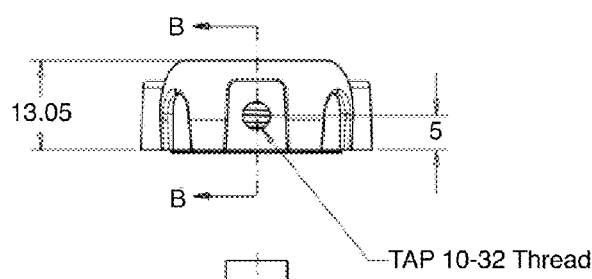
Fig. 2f
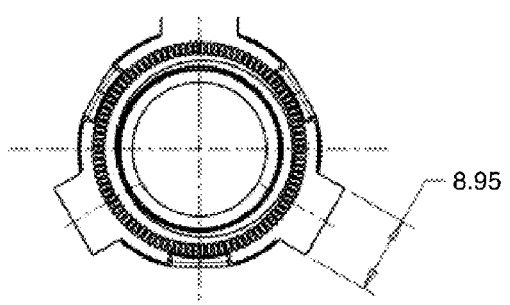

ELECTRICAL LOCKING HUB NUT

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

BACKGROUND

1. Field of the Invention

This invention relates to electrical fittings used in the installation of electrical conduit, and namely an improved locking hub nut.

2. Background of the Invention

The current state of knowledge is as follows. Electrical conduit is a system used for protection and routing of electrical wiring. Electrical conduit is generally made of metal or plastic polymers, and protects the wiring from mechanical damage and chemical interference, e.g. water. Conduit also requires the use of special fittings for connections, end points, and so forth. Two common electrical connectors are snap-in connectors and multi-part connectors. Snap-in connectors use a snap-in ring to quickly connect to a junction box, and multipart connectors use threaded, multipart lock-nut components. Various types of wiring can be pulled into a conduit, which simplifies building design and construction as well as building renovations, since wiring can be added or replaced by pulling through the existing conduit.

However, wiring is frequently damaged during such pulls due to the interaction of the wiring on the fittings that are used, often resulting in the wiring insulation being damaged and/or removed from sections. Since the use and installation details for conduit are governed by various building codes, this kind of damage can make the difference between a successful inspection or an inspection that requires re-installation.

One way to reduce the incidence of damaging the wiring is to install the wiring in two person teams with one person feeding the wire while the other pulls it through the conduit. However, this doubles the labor cost both in terms of actual expenses as well as efficiency.

Another solution has been to use a plastic bushing to cover the sharp edges that might damage the wiring. Plastic bushings are intended to protect already installed wire during hot/cold expansion or mechanical movement. However, and although the plastic bushings are helpful for already installed wire, they are nonetheless sharp enough to damage wire during pulling and are not designed for this.

Significant problems also arise with the fittings. For instance, snap-in electrical connectors are known to be problematic for having a loose electrical connection, which can be dangerous, and they allow contaminants to enter the connection. Multipart connectors are known to be problematic for many reasons, including the inherent clumsiness of the required disassembly and reassembly, use for special tools for tightening, the potential of lost locknuts, cross-threading of the locknuts, the large amount of space used within the junction box, and the non-optional destruction of the connector that occurs during disassembly.

There remains a need for a locking hub nut that does not damage the wiring during pulling, frees up manpower by allowing one person rather than two to be able to do the pulling, has a simplified design, and which has universal threading for conduit of all currently approved sizes and materials.

BRIEF SUMMARY OF THE INVENTION

Accordingly, provided herein in order to address problems in the prior art is an electrical connector for terminating an electrical conduit having a protective rounded rim to avoid wire insulation damage, comprising: a locking hub nut, wherein said locking hub nut is toroid-shaped and has a rounded end and a flat end, said locking hub nut having a central axial bore extending therethrough, said locking hub nut having an external surface having a plurality of ribs for cooperative engagement during conduit installation, wherein central axial bore is screw-threaded along an inner surface, wherein the rounded end has a rounded rim, said rounded rim having a substantially smooth surface and extending inwardly into the central axial bore, wherein upon threading wiring through the central axial bore the rounded rim guides the wiring travelling therethrough in such a manner that there is minimal interaction with any sharp edges while being pulled through a length of conduit and interacting with the locking hub nut during such a pull operation, and wherein the locking hub nut has a height from flat end to rounded end of from about 11 mm to about 16 mm and provides for engagement with a junction box without using a lock nut.

In a preferred embodiment, the electrical connector further comprises wherein flat end has gripping projections that allow the locking hub nut to engage with the junction box and increase the frictional interaction to substantially prevent unwanted rotation.

In a preferred embodiment, the electrical connector further comprises wherein the locking hub nut has a central axial bore that is sized to engage with conduit of a specific diameters, said conduit diameter selected from a group of standard conduit sizes comprising ½", ¾", 1", 1¼", 1½", 2", 2½", 3", 3½", 4", 5", and 6".

In a preferred embodiment, the electrical connector further comprises wherein the locking hub nut has a central axial bore sized to engage conduit of a diameter comprising ½", ¾", or 1".

In a preferred embodiment, the electrical connector further comprises wherein the external surface has a plurality of screw lugs, wherein said screw lugs function as a conduit engagement system with one or more setscrews inserted into a through-hole of said screw lugs, and wherein said conduit engagement system provides a mechanism for securing conduit into position.

In a preferred embodiment, the electrical connector further comprises wherein the flat end has gripping projections that allow the locking hub nut to engage with the junction box and increase the frictional interaction to substantially prevent unwanted rotation.

In a preferred embodiment, the electrical connector further comprises wherein the locking hub nut is manufactured from galvanized steel or die-cast zinc.

BRIEF DESCRIPTION OF THE DRAWINGS

FIG. 1 is a diagram of various views of the inventive subject matter. FIG. 1 shows a perspective view, both top down and bottom up, an external side view, a top view, a bottom view, and a side cross-sectional view.

FIG. 2 is a diagram of various views of the version of inventive subject matter having screw lugs for using setscrews to secure conduit. FIG. 2 shows a perspective view, both top down and bottom up, an external side view, a top view, a bottom view, and a side cross-sectional view.

DETAILED DESCRIPTION OF THE INVENTION

Figure 3:
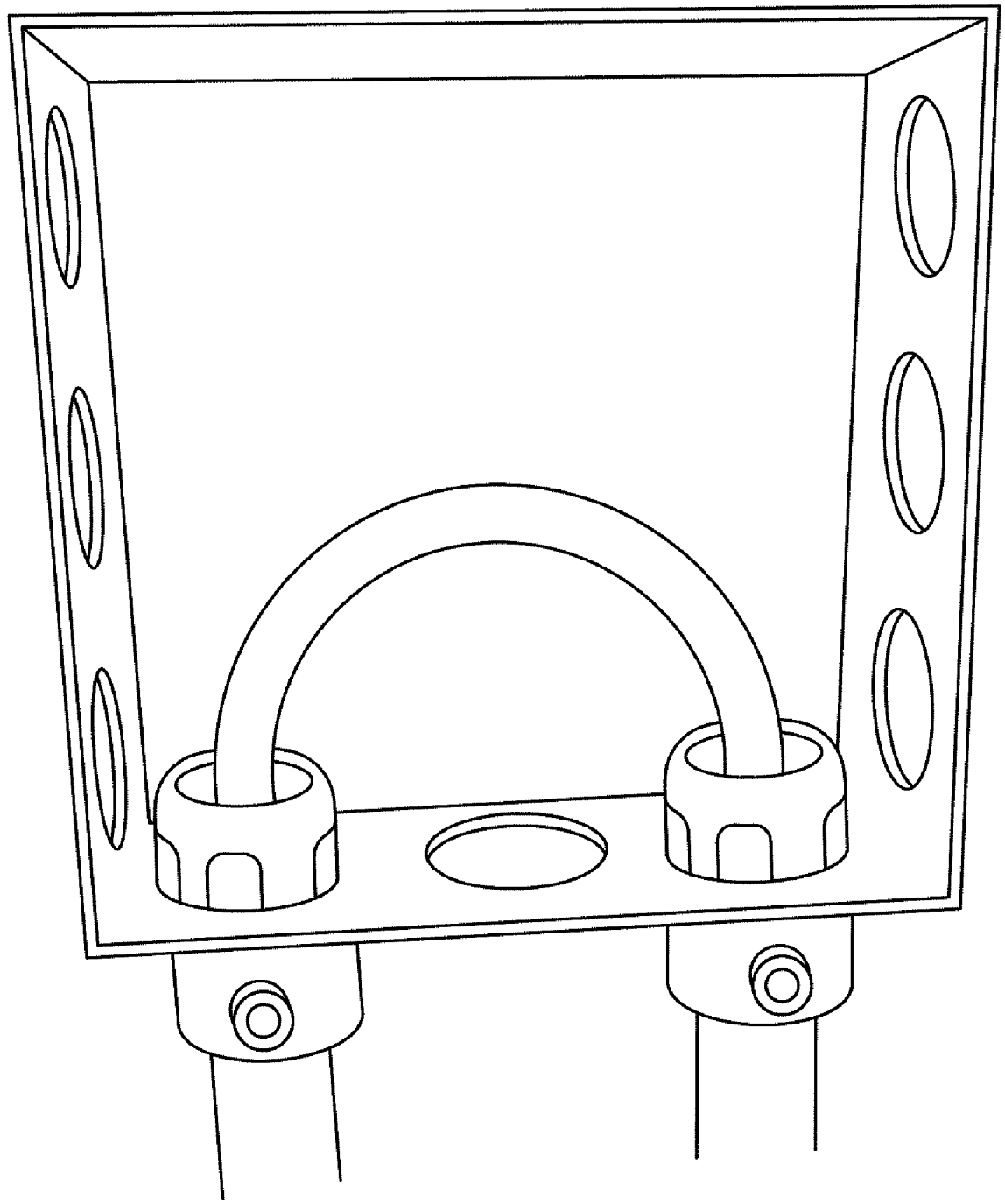
FIG. 3 is a graphical representation of the inside of a junction showing two locking hub nuts in operation.

The locking hub nut 10 of the present invention is shown in FIGS. 1 and 2. Referring now to the figures, locking hub nut 10 is a toroid-shaped unit having a rounded end 12 and flat end 14. Rounded end has a rounded rim 12a which is substantially smooth and functions to guide conduit wiring (not shown) away from damaging sharp edges and substantially prevents damage to the wire insulation. Locking hub nut 10 has an internal central bore 16 which is concentric with axis 18, and an octagonal configuration of external surface 20 which permits engagement by a suitable installation tool for tightening. Internal central bore 16 is screw-threaded along the inner surface 22. External surface 20 has a plurality of ribs 24, and without limiting the invention to the octagonal design shown, said ribs 24 allow for engagement by a common channel lock pliers (not shown), rather than requiring any special tightening tool or risking damage to the screw-driver which is commonly used by electricians to tighten such nuts. Ribs 24, without limitation, are here composed of recess 24a and projection 24b.

The rounded end 12 is the portion of the locking hub nut 10 that interacts with the wire (not shown) being pulled through the conduit and provides a smooth surface so as not to damage, or rip, the insulation that covers electrical wires. In operation, rounded rim 12a extends inwardly into the topmost space of the central bore 16 such that when the unit (nut 10) is viewed from directly above and looking through the bore 16, the rounded rim or rounded lip (12a) can be seen to guide a wire travelling therethrough in such a manner that there is little or no interaction with the threaded sidewalls nor with any edged or sharp or otherwise damaging surface that a wire might encounter while be pulled through a length of conduit and interacting with the locking hub nut during such a pull operation.

Flat end 14 may be outfitted with gripping projections 26 (shown in FIG. 2) such as a plurality of teeth, knobs, knurling, checkering, texturing, or surface features that allow the locking hub nut to engage with the junction box and increase the frictional interaction to substantially prevent unwanted rotation.

The internal central bore 16 is screw-threaded for universal engagement with current types of conduit and connectors. Importantly, the unit is constructed with enough threads such that it is tall enough to eliminate the need for a traditional lock nut, thus simplifying the installation and reducing the number of parts required for installing conduit. Since most junction boxes are 3/16" thick, the locking hub nut 10 provided herein fits over existing connectors and provides a flush fit, with no edge. In preferred embodiments, the unit ranges in height from:

about 11 mm to about 16 mm, and from about 12 mm to about 15 mm and from about 12.5 mm to about 13.5 mm, and from about 12.8 mm to about 13.2 mm, and also includes without limitation each independent value therebetween, such as in FIG. 1 and FIG. 2 which shows an illustrated height of 13.05 mm, along with other illustrative dimensional values.

In one preferred embodiment, the threading 22 has a 1.8 pitch, but which can be varied according to the need.

In FIG. 1, the locking hub nut 10 is manufactured to accommodate conduit of many diameters, including all standard sizes such as ½", ¾", 1", 1¼", 1½", 2", 2½", 3", 3½", 4", 5", and 6". In one of the preferred embodiment, the locking hub nut 10 is capable of engageably threading onto conduit of diameter ½", or ¾", or 1".

Referring now to FIG. 2 of the drawings, another preferred embodiment of the locking hub nut 10 is shown. Similar to FIG. 1, except FIG. 2 illustrates the addition of screw lugs 26 on external surface 20. Screw lugs 26 are used in this embodiment as a conduit engagement system whereby setscrew 28 (not shown) is inserted in through-hole 30. Through-hole 30 is threaded on inner surface 32 and allows setscrew 28 to engage the conduit which is inserted in the locking hub nut 10 through internal central bore 16, and provides a mechanism for securing said conduit into position.

As stated above, FIG. 2 illustrates how flat end 14 may be outfitted with gripping projections 34, and may include a plurality of teeth, knobs, knurling, checkering, texturing, or surface features that allow the locking hub nut to engage with the junction box and increase the frictional interaction to substantially prevent unwanted rotation.

Referring now to FIG. 3 of the drawings, an example is shown of two locking hub nuts located inside a junction box. As can be seen, the conduit travels smoothly due to the rounded rim.

In preferred embodiments, the locking hub nut is manufactured from galvanized steel. In other preferred embodiment, as with other electrical fittings for general purpose use with metal conduits, may be made of die-cast zinc, but where stronger fittings are needed, they are made of copper-free aluminum or cast iron. Alternatively, it may be nickel coated.

The unit is preferably made from a poured mould. Casting methods are well known and include without limitation investment casting, die casting, vacuum casting, and centrifuge casting. Although galvanized steel is preferred for economic reasons, the unit may also be made from any hard conductive metal, alloy, or composite.

Conduit systems are classified by the wall thickness of tubing, mechanical stiffness of the tubing, and material used to make the tubing. Locking hub nut 10 provides a universal solution for many types of conduit including the following.

Example: Rigid Metal Conduit (RMC)

Rigid Metal Conduit (RMC) is a thick threaded tubing, usually made of coated steel, though it may be aluminum. Thicker-walled than IMC.

Example: Rigid Nonmetallic Conduit (RNC)

Rigid Nonmetallic Conduit (RNC) is a non-metallic unthreaded tubing.

Example: Galvanised rigid conduit (GRC)

Galvanised rigid conduit (GRC) is galvanised steel tubing, with a tubing wall that is thick enough to allow it to be threaded. Its common applications are in commercial and industrial construction.

Example: Electrical metallic tubing (EMT)

Electrical metallic tubing (EMT), sometimes called thinwall, is commonly used instead of galvanised rigid conduit (GRC), as it is less costly and lighter than GRC. EMT is not threaded. Lengths of conduit are connected to each other and to equipment with clamp-type fittings. Like GRC, EMT is more common in commercial and industrial buildings than in residential applications. EMT is generally made of coated steel, though it may be aluminum.

Example: Electrical Nonmetallic Tubing (ENT)

Electrical Nonmetallic Tubing (ENT) is a thin-walled corrugated tubing that is moisture-resistant and flame retardant. It is pliable such that it can be bent by hand and is often flexible although the fittings are not. It is not threaded due to its corrugated shape although the fittings might be.

Example: Flexible Metallic Conduit (FMC), Armored Cable (Type AC), and Metallic-Clad (Type MC) Cable Flexible Metallic Conduit (FMC) is made through the coiling of a self-interlocked ribbed strip of aluminum or steel, forming a hollow tube through which wires can be pulled. Armored (Type AC) and Metallic-Clad (Type MC) cables are very similar in appearance to FMC. The difference between FMC and AC or MC is that FMC is a conduit and AC/MC are sheathed cable.

Example: Liquidtight Flexible Metal Conduit (LFMC)

Liquidtight Flexible Metal Conduit (LFMC) is a non-metallic and liquidtight jacket covering a flexible metal interior. The interior is similar to FMC.

Example: Flexible Metallic Tubing (FMT)

Flexible Metallic Tubing (FMT) is a liquidtight metallic tubing but unlike LFMC, it lacks a non-metallic jacket.

Liquidtight Flexible Nonmetallic Conduit (LNFC)

Liquidtight Flexible Nonmetallic Conduit (LNFC) refers to several types of flame-resistant non-metallic tubing. Interior surfaces may be smooth or corrugated. There may or may not be integral reinforcement within the conduit wall. It is also known as FNMC.

Aluminum conduit

Aluminum conduit, similar to Galvanized Metal Conduit (GMC), is a rigid conduit, generally used in commercial and industrial applications, where a higher resistance to corrosion is needed.

Intermediate metal conduit (IMC)

Intermediate Metal Conduit (IMC) is a steel tubing heavier than EMT but lighter than RMC. It may be threaded.

PVC conduit

PVC conduit is the lightest in weight compared to other conduit materials, and usually lower in cost than other forms of conduit. In North American electrical practice, it is available in three different wall thicknesses, with the thin-wall variety only suitable for embedded use in concrete, and heavier grades suitable for direct burial and exposed work. The various fittings made for metal conduit are also made for PVC. The plastic material resists moisture and many corrosive substances, but since the tubing is non-conductive an extra bonding (grounding) conductor must be pulled into each conduit.

TABLE 1

Comparative Advantages

| | |
|---|---|
| WHEN HEAVIER CABLE IS PULLED FROM SERVICE GEAR OR JUNCTION BOXE'S THE SLICKNUT IS THE FIRST TO MAKE BOND TO METAL, AND IS DESIGNED TO WIDTHSTAND THE PREASSURE OF CABLE RESTING ON THE INSIDE PERAMETER WITHOUT BREAKING OR SNAGGING ON ANY SHARP EDGES. | PLASTIC BUSHING, WILL SNAP OR STRIP OFF THE THREADS AND CAUSE THE INSULATION OFF THE CABLE TO GET DAMAGED. GROUND BUSHING, CAUSES FRICTION BETWEEN PLASTIC INSULATION OF CABLE, AND PLASTIC AROUND GROUND BUSHING, MUST BE MONITERED WHEN PULLING CABLE SO INSULATION DOES NOT GET DAMAGED. |
| WHEN PUSHING WIRE IN SERVICE GEAR OR JUNCTION BOXE'S, THERE WILL BE NO RESISTANCE TO CABLE WHEN EXITING. THERE IS NO INSIDE LIP TO STOP FISHTAPE OR WIRE FROM ENTERING OR EXITING. | PLASTIC BUSHING, HAS INSIDE LIP AND 75% OF THE TIME WILL STOP FISHTAPE OR WIRE FROM EXITING OUT OF CONNECTOR. GROUND BUSHING, HAS SAME ISSUES WITH INTERIOR LIP. |
| SLICKNUT CAN BE CONVERTED TO BE A GROUNG BUSHING USING EXISTING GROUND LUGS ON THE MARKET TODAY | PLASTIC BUSHING, GROUND BUSHING CANNOT BE MULTI USE. NOT COST EFFICIENT. |

TABLE 2

Comparative Advantages

| SLICKNUT | COMPETITION |
|---|---|
| NO NEED FOR LOCK NUT ON ANY CONNECTOR | PLASTIC BUSHING, NEEDS LOCKNUT GROUNDING BUSHING, NEEDS LOCKNUT |
| FIT'S COMPLETELY OVER ANY SIZE CONNECTOR, AND COVERS THREADS TO THE FRACTION, LEAVING NO SHARP EDGES ON PERAMETER | PLASTIC BUSHING COVERS THREADS, BUT HAS A LOT OF FRICTION. THREADS STILL EXPOSED. LEAVING SHARP EDGES. GROUNDING BUSHING NOT USED, ALSO |
| WHEN WIRE IS PULLED FROM ANY DIRECTION, THERE WILL BE NO DAMAGES TO THE INSULATION OF WIRE. | PLASTIC BUSHING HAS FRICTION, INSULATION ON WIRE AND PLASTIC BUSHING RUBBING TOGETHER CAUSES PLASTIC BUSHING TO FAIL AND GROOVE OR SNAP OFF CONNECTOR. GROUND BUSHING CAN ONLY BE USED |

TABLE 2-continued

Comparative Advantages

| SLICKNUT | COMPETITION |
| --- | --- |
| | FROM 1 INCH AND ABOVE, ALSO PLASTIC AGAINST PLASTIC CAUSING TO MUCH FRICTION. |
| NEVER FORGET BUSHING, SLICKNUT IS THE LOCKNUT, BUSHING, AND GROUND HUB COMBINED. MULTI FUNCTIONAL | WHEN HEAVIER CABLE IS PULLED, SOME TIMES YOU DON'T REALIZE THAT YOU FORGOT TO INSTALL PLASTIC BUSHING OR GROUND BUSHING, AND YOU END UP TAKING ALL CONNECTIONS APART. |
| SLICKNUT ELIMATES THE NEED FOR A SHEEVE TO BE USED WHEN PULLING HEAVY CABLE, DOES NOT LOOSE THE INSIDE CIRCUMFERENCE, MAINTAINS PIPE SIZE. | CANNOT INSTALL PLASTIC BUSHING OR GROUND BUSHING WHEN USING SHEEVE. BOTH HAVE INSIDE SMALLER PERAMETER WHICH SHEEVE WILL NOT |
| SLICKNUT COSTS A FRACTION OF THE PRICE TO PRODUCE AND EFFICIENT ENOUGH TO SELL CHEAPER THAN COMPETITERS. MULTI FUNCTIONAL | PLASTIC BUSHINGS, ONLY USED WHEN PULLING LOW VOLTAGE, OR SERVICE GEAR AND JUNCTION BOXE'S. GROUNDING BUSHINGS MAINLY ON SERVICE GEAR OR SUB PANELS. |
| SLICKNUT CAN REPLACE THE USE OFF STEEL LOCKNUTS, PLASTIC BUSHINGS, GROUND BUSHINGS, AND AN ASSISTANT TO HELP PULL SMALLER CABLE. | ANY ITEMS ON THE CURRENT MARKET CANNOT DO WHAT THE SLICK NUT IS CAPABLE OF DOING. |
| ONE MAN OPERATION TO PULL FROM MULTIPLE JUNCTION BOXES, ELIMINATES THE NEED FOR AN ASSISTANT TO PULL WIRE. | PLASTIC BUSHING, PLASTIC AGAINST PLASTIC BUSHING BREAKS OR GROVES FROM PULLGROUND BUSHING ONLY USED FOR MAIN SERVICE, AND SUB PANELS, AND AGAIN PLASTIC TO |
| SLICKNUT WILL NOT STRIP THREADS OR BREAK AS EASY. CAN BE SCREW DRIVER AND KLEINS SMACKED TO TIGHTEN. OR CHANNEL LOCKS. | STEEL LOCK NUT WILL STRIP AND CRACK IF TIGHTENED TO MUCH, AND CANNOT USE CHANNEL LOCK IF MORE THAN ONE CONNECTOR IS SIDE BY SIDE. |

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. An electrical connector for terminating an electrical conduit having a protective rounded rim to avoid wire insulation damage, comprising: a locking hub nut, wherein said locking hub nut is toroid-shaped and has a rounded end and a flat end, said locking hub nut having a central axial bore extending therethrough, said locking hub nut having an external surface having a plurality of recessed portions that define a plurality of ribs for cooperative engagement during conduit installation, wherein said ribs do not project beyond the external diameter of the locking hub, wherein the central axial bore is screw-threaded along an inner surface, wherein the rounded end has a rounded rim, said rounded rim having a substantially smooth surface and extending inwardly into the central axial bore, and wherein the rounded rim joins the exterior surface to create a continuous smooth surface, wherein upon threading wiring through the central axial bore the rounded rim guides the wiring travelling therethrough in such a manner that there is minimal interaction with any sharp edges while being pulled through a length of conduit and interacting with the locking hub nut during such a pull operation, and wherein the locking hub nut has a height from flat end to rounded end of from about 11 mm to about 16 mm and provides for engagement with a junction box without using a lock nut.

2. The electrical connector of claim 1, further comprising wherein flat end has gripping projections that allow the locking hub nut to engage with the junction box and increase the frictional interaction to substantially prevent unwanted rotation.

3. The electrical connector of claim 1, further comprising wherein the locking hub nut has a central axial bore that is sized to engage with conduit of a specific diameters, said conduit diameter selected from a group of standard conduit sizes comprising ½", ¾", 1", 1¼", 1½", 2", 2½", 3", 3½", 4", 5", and 6".

4. The electrical connector of claim 3, wherein the locking hub nut has a central axial bore sized to engage conduit of a diameter comprising ½", ¾", or 1".

5. The electrical connector of claim 1, further comprising wherein the external surface has a plurality of externally smooth screw lugs, wherein said screw lugs function as a conduit engagement system with one or more setscrews inserted into a through-hole of said screw lugs, and wherein said conduit engagement system provides a mechanism for securing conduit into position.

6. The electrical connector of claim 5, further comprising wherein the flat end has gripping projections that allow the locking hub nut to engage with the junction box and increase the frictional interaction to substantially prevent unwanted rotation.

7. The electrical connector of claim 1, further comprising wherein the locking hub nut is manufactured from galvanized steel or die-cast zinc.

8. The electrical connector of claim 1, further comprising wherein the locking hub nut is manufactured from steel, stainless steel, polymer, cast iron, or aluminum.

* * * * *